US009279889B2

(12) United States Patent
Kume et al.

(10) Patent No.: US 9,279,889 B2
(45) Date of Patent: Mar. 8, 2016

(54) LIGHT DETECTION UNIT AND ALPHA RAY OBSERVATION DEVICE

(71) Applicant: Kabushiki Kaisha Toshiba, Minato-ku (JP)

(72) Inventors: Naoto Kume, Yokohama (JP); Hidehiko Kuroda, Yokohama (JP); Kunihiko Nakayama, Tama (JP); Kei Takakura, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/652,697

(22) PCT Filed: Jan. 30, 2014

(86) PCT No.: PCT/JP2014/000484
§ 371 (c)(1),
(2) Date: Jun. 16, 2015

(87) PCT Pub. No.: WO2014/119316
PCT Pub. Date: Aug. 7, 2014

(65) Prior Publication Data
US 2015/0323681 A1    Nov. 12, 2015

(30) Foreign Application Priority Data

Jan. 31, 2013  (JP) ................................. 2013-017418

(51) Int. Cl.
| | |
|---|---|
| *G01T 3/00* | (2006.01) |
| *G01T 3/08* | (2006.01) |
| *G01T 1/17* | (2006.01) |
| *G01T 1/20* | (2006.01) |
| *G01T 1/16* | (2006.01) |

(52) U.S. Cl.
CPC .................. *G01T 1/17* (2013.01); *G01T 1/1603* (2013.01); *G01T 1/2018* (2013.01)

(58) Field of Classification Search
CPC .................................... G01T 3/00; G01T 3/08
See application file for complete search history.

(56) References Cited

U.S. PATENT DOCUMENTS

| | | |
|---|---|---|
| 6,281,502 B1 | 8/2001 | Pineau et al. |
| 2008/0210880 A1 | 9/2008 | Baroni et al. |
| 2012/0091351 A1 | 4/2012 | Azechi et al. |

FOREIGN PATENT DOCUMENTS

| | | |
|---|---|---|
| JP | 2000 507698 | 6/2000 |
| JP | 2008 533458 | 8/2008 |
| JP | 2010 261753 | 11/2010 |

OTHER PUBLICATIONS

Chichester, David L., et al., "Multispectral UV-Visual Imaging as a Tool for Locating and Assessing Ionizing Radiation in Air", Nuclear Science Symposium Conference Record, (2010), pp. 447-453.
Sand, J., et al., "Remote Optical Detection of Alpha Radiation", IAEA-CN-184/23, (2005), (Total 6 Pages).
International Search Report Issued Apr. 28, 2014 in PCT/JP2014/000484 Filed Jan. 30, 2014.

*Primary Examiner* — David Porta
*Assistant Examiner* — Faye Boosalis
(74) *Attorney, Agent, or Firm* — Oblon, McClelland, Maier & Neustadt, L.L.P.

(57) ABSTRACT

A light detecting unit of an alpha ray observation device observes an alpha ray by measuring generated light that is generated by the alpha ray produced in a region of a to-be-measured object. The light detecting unit has a travel direction changing unit that changes the direction of travel of generated light, a light detector that detects direction-changed light, which is the generated light after the direction of travel is changed, and a shielding member that shields the light detector from radiation and has a portion that is provided on the line from the to-be-measured object to the light detector. The shielding member may also surround the perimeter of the light detector and have an opening to allow generated light to reach the travel direction changing unit.

9 Claims, 9 Drawing Sheets

LIGHT DETECTION UNIT AND ALPHA RAY OBSERVATION DEVICE

TECHNICAL FIELD

Embodiments of the present invention relate to a light detecting unit and an alpha ray observation device.

BACKGROUND ART

As a radiation detector, especially alpha rays detector, for example, a detector that uses a ZnS scintillator is known. The ZnS scintillator emits light at a time when alpha rays enter. On the other hand, an alpha ray observation device is known that makes use of the characteristics of alpha rays that cause nitrogen in the atmosphere to emit light. This device is able to observe alpha rays even from a remote place by making use of the characteristics of alpha rays that cause nitrogen in the atmosphere to emit light and observing the light emitted from nitrogen in order to detect alpha rays. The light being emitted is ultraviolet light.

Figure 9:
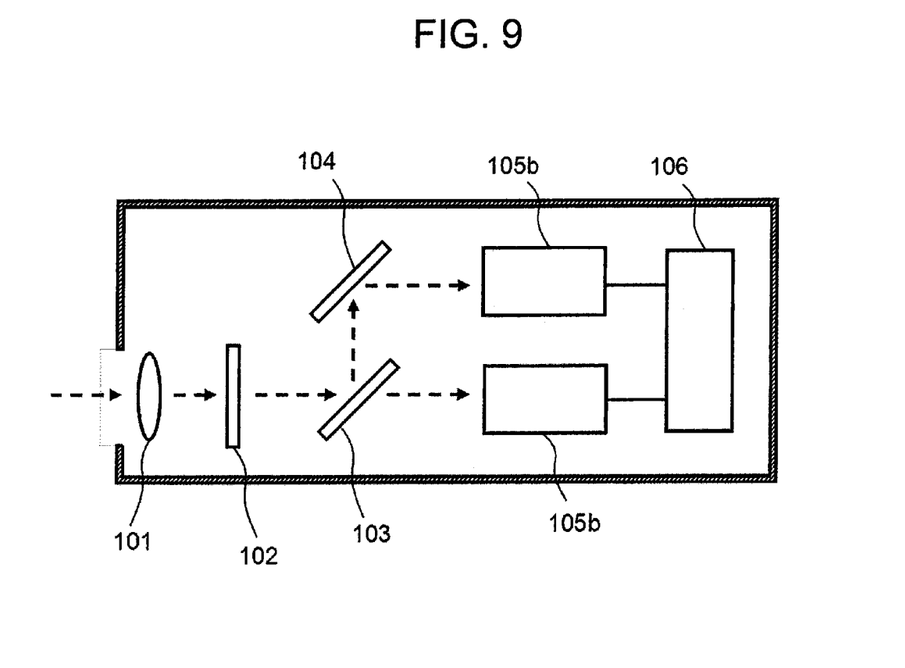
FIG. 9 is a lateral cross-sectional view showing an example of a conventional configuration of an alpha ray observation device that detects alpha rays by observing the light emitted from nitrogen.

FIG. 9 is a lateral cross-sectional view showing an example of a conventional configuration of an alpha ray observation device that observes the light emitted from nitrogen to detect alpha rays.

As shown in FIG. 9, what is known is an alpha ray observation device that includes: a collecting lens 101, which collects the light emitted from nitrogen; a wavelength selection element 102, which extracts, from the collected light, the light emitted from nitrogen; an optical element 103, which separates the extracted nitrogen-originated light into transmitted light and reflected light; a direction changing unit 104, which changes the propagation direction of the reflected light; light detectors 105a and 105b, which respectively receive the transmitted light and the reflected light to count the number of photons; and a signal processing device 106, which selects the nitrogen-originated light caused by alpha rays as the light detector 105a measures the transmitted light and the light detector 105b measures the reflected light simultaneously.

PRIOR ART DOCUMENTS

Patent Documents

Patent Document 1: Jpn. Pat. Appln. Laid-Open Publication No. 2000-507698.

Non-Patent Documents

Non-Patent Document 1: Remote Optical Detection of Alpha Radiation, IAEA-CN-184/23.

SUMMARY OF THE INVENTION

Problems to be Solved by the Invention

The problem with the above-described device is that an error occurs in measured values as the measurement environment changes. For example, if the target to be detected by the detectors contain not only alpha rays but also gamma rays and the like, the problem is that noise signals would emerge due to the effects of gamma rays, leading to an error in the measured results.

As shown in FIG. 9, alpha rays are measured by measuring the light emitted from nitrogen. However, the light emitted from nitrogen near a source of alpha rays goes straight to the light detectors in this system. Many of nuclides of the alpha ray sources may also be gamma ray sources. In such a case, gamma rays reach the detectors as well. Even if an alpha ray source does not work as a gamma ray source, gamma rays from the environment would influence the results of alpha rays measuring.

Embodiments of the present invention have been made to solve the above problems. The object of the embodiments is to accurately measure a signal that is derived from alpha rays even in the measurement environment of gamma rays and else, when alpha rays are to be observed by measuring the light generated by alpha rays.

Means for Solving the Problem

According to an embodiment, there is provided a light detecting unit to observe alpha rays by measuring a generated light generated by alpha rays occurring in a region of a to-be-measured object, comprising: a travel direction changing unit configured to change a travelling direction of the generated light; a light detector configured to detect direction-changed light of the generated light changed in traveling direction; and a shielding member including a portion provided on a straight line extending from the to-be-measured object to the light detector to shield the light detector against radiation.

Advantage of the Invention

According to embodiments of the present invention, it is possible to accurately measure a signal that is derived from alpha rays even in the measurement environment such as those of gamma rays, when alpha rays are to be observed by measuring the light generated by alpha rays.

EMBODIMENTS FOR CARRYING OUT THE INVENTION

Hereinafter, with reference to the accompanying drawings, embodiments of a light detecting unit and an alpha ray observation device of the present invention will be described. The same or similar portions are represented by the same reference symbols, and a duplicate description will be omitted.

[First Embodiment]

Figure 1:
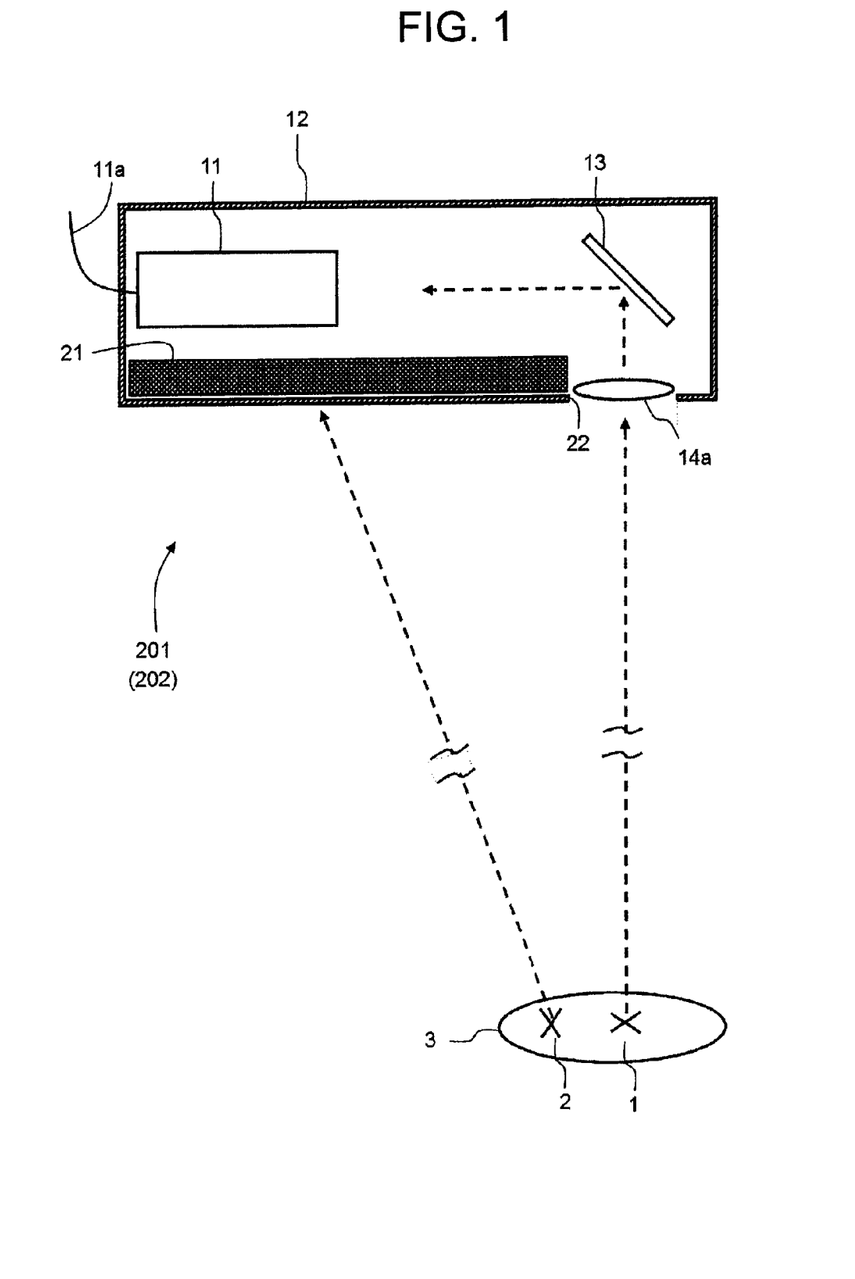
FIG. 1 is a lateral cross-sectional view showing the configuration according to a first embodiment of the present invention.

FIG. 1 is a lateral cross-sectional view showing the configuration according to a first embodiment of the present invention. FIG. 1 is referred to as a lateral cross-sectional view. However, this does not necessarily mean a lateral view or any other view with respect to the vertical direction; the direction does not matter. The same is true for the other drawings described below.

An alpha ray observation device 202 is used to confirm whether or not an alpha ray source 1 exists in a to-be-measured object 3. As shown in FIG. 1, in many cases, a gamma ray source 2, too, exists in the to-be-measured object 3. Specifically, the alpha ray observation device 202 includes one light detecting unit 201.

If the alpha ray source 1 exists in the to-be-measured object 3, emission of the alpha rays from the alpha ray source 1 excites nitrogen in the ambient air due to interaction with alpha rays. Ultraviolet light of a specific wavelength is emitted when the excited nitrogen returns to the ground state.

The wavelength of ultraviolet light that is released due to interaction between alpha rays and nitrogen is about 311.67 nm to 391.44 nm, or that of near-ultraviolet light whose wavelength is close to visible light. Ultraviolet light with a wavelength of 313.6 nm, 315.93 nm, 337.13 nm, or the like is relatively high in intensity. These rays mentioned above are collectively referred to as ultraviolet light.

The alpha ray observation device 202 observes the existence of alpha rays by detecting the ultraviolet light through the light detecting unit 201.

The light detecting unit 201 includes a collecting unit 14a, a travel direction changing unit 13, a light detector 11, a shielding member 21, and a housing 12 which houses the above components.

The collecting unit 14a has a function of collecting ultraviolet light emitted from the to-be-measured object 3. If the light detecting unit 201 is located near the to-be-measured object 3, and if an receiving area of ultraviolet light is large, the direction of ultraviolet light reaching the light detecting unit 201 has a three-dimensional spread. Therefore, the ultraviolet light is needed to be turned into parallel light, or to converge at the position of the light detector 11.

The collecting unit 14a may be a single lens, plano-convex lens, or concave mirror, for example. The collecting unit 14a may be coated with an antireflection film or the like in order to improve the collection of light in a wavelength range that contains wavelength of ultraviolet light, which is a detection target of the light detector 11.

The light detector 11 detects ultraviolet light that is generated due to interaction between alpha rays and nitrogen in the ambient air to reach the light detector 11. For example, the light detector 11 may be such a detector as a photomultiplier tube or MPPC (Multi-Pixel Photon Counter); cooled CCD (Charge Coupled Device); or CMOS (Complementary Metal Oxide Semiconductor) camera.

The photomultiplier tube, MPPC, or the like can obtain a plurality of sets of two-dimensional data if the components are turned into an array. In the case of the cooled CCD, the sensitivity can be changed by carrying out binning or the like.

An output of the light detector 11 is retrieved from the light detecting unit 201 via an output cable 11a. The retrieval means is not limited to the cable. For example, external equipment may exchange signals with the light detecting unit 201 in a wireless or any other manner.

The shielding member 21 is provided between the light detector 11 and the to-be-measured object 3. The shielding member 21 functions as a radiation shield to block gamma rays from the to-be-measured object 3, so that gamma rays from the gamma ray source 2 in the to-be-measured object 3 do not directly reach the light detector 11. The shielding member 21 is preferably made of high-density material, such as tungsten, lead, gold, or stainless steel.

For example, gamma rays released from Cs137 as the gamma ray source 2, which is relatively abundant in the normal environment, has transmittance described as follows with respect to the thickness of each material.

That is, in the case of stainless steel, the transmittance is 55% when the thickness is 1 cm; 30% when the thickness is 2 cm; and 16% when the thickness is 3 cm. In the case of lead, the transmittance is 24% when the thickness is 1 cm; 5.8% when the thickness is 2 cm; and 1.4% when the thickness is 3 cm. In the case of tungsten, the transmittance is 12% when the thickness is 1 cm; 1.5% when the thickness is 2 cm; and 0.2% when the thickness is 3 cm.

The material may be selected and the thickness may be set based on a required attenuation amount that is calculated based on an estimated intensity of gamma rays that reach the shielding member 21.

The travel direction changing unit 13 changes the direction of ultraviolet light collected by the collecting unit 14a. The shielding member 21 is provided to prevent gamma rays emitted from the to-be-measured object 3 from directly reaching the light detector 11. Then, ultraviolet light emitted from the to-be-measured object 3 does not directly reach the light detector 11 as well. The travel direction changing unit 13 is therefore provided to direct ultraviolet light to the light detector 11 when the ultraviolet light enters the light detecting unit 201 from the to-be-measured object 3.

The travel direction changing unit 13 may be a mirror, prism, crystal lattice, or the like, for example. If the mirror is used, the mirror may be coated with UV-reflection strengthening aluminum or the like in order to reflect, in a highly efficient manner, ultraviolet light generated from the alpha ray source 1. The mirror may be a concave mirror or any other mirror with the ability to collect light.

Figure 2:
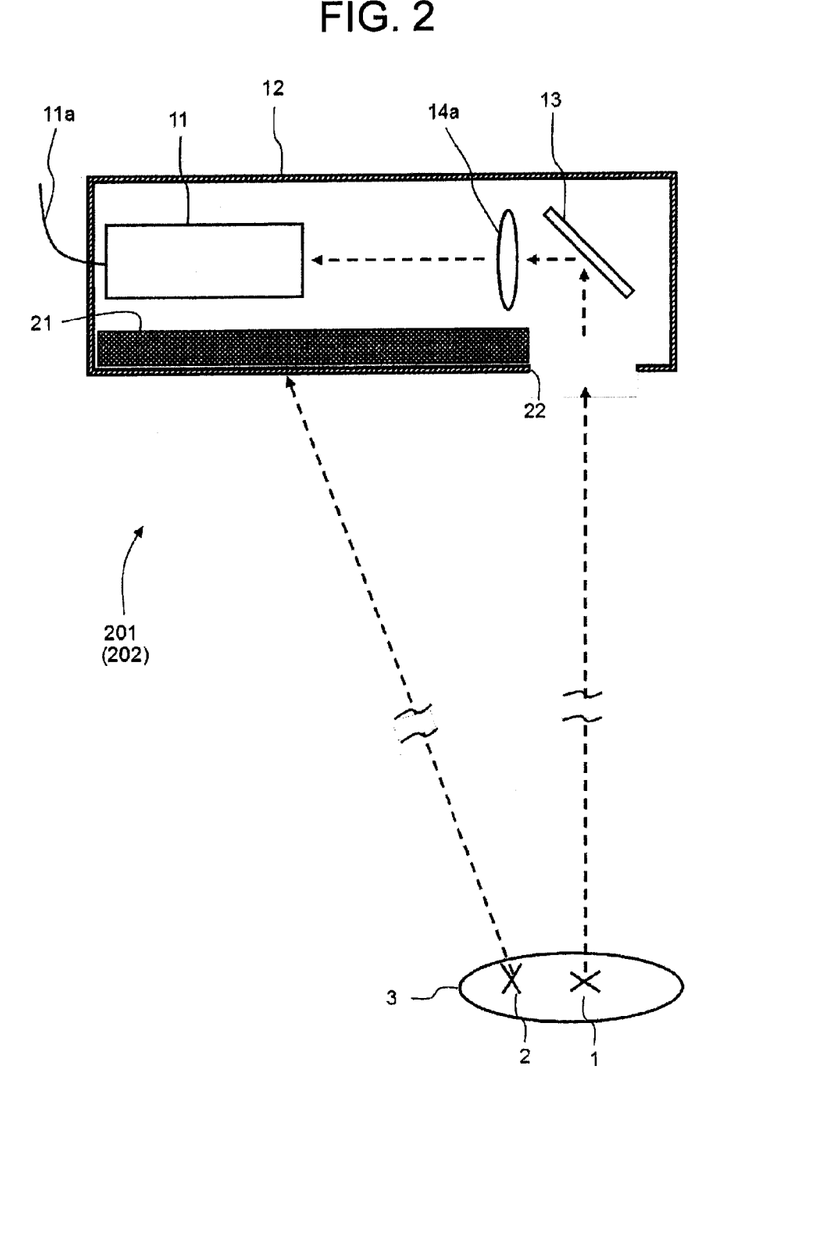
FIG. 2 is a lateral cross-sectional view showing the configuration of a modified example according to the first embodiment of the present invention.

In the case of FIG. 1, the travel direction changing unit 13 is provided between the collecting unit 14a and the light detector 11. However, the configuration is not limited to this. FIG. 2 is a lateral cross-sectional view showing the configuration of a modified example according to the first embodiment of the present invention. For example, as shown in FIG. 2, the components may be arranged in such a way that, after the traveling direction of ultraviolet light is changed by the travel direction changing unit 13, ultraviolet light is collected by the collecting unit 14a to enter the light detector 11.

If gamma rays are being released from the to-be-measured object 3, the use of a heavy material with a large atomic number for the travel direction changing unit 13 should be avoided, for example, in order to prevent gamma rays from being scattered by the travel direction changing unit 13; or any other measure should be taken. In this manner, the material of the travel direction changing unit 13 is selected, and the weight and other factors are set.

In the housing 12, an entry opening 22 is formed in order to take in ultraviolet light from the to-be-measured object 3. In FIG. 1, in the entry opening 22, the collecting unit 14a is mounted. The shielding member 21 is disposed in such a way as not to close the entry opening 22.

According to the above-described configuration of the present embodiment, when the alpha ray source 1 releases alpha rays, ultraviolet light is generated due to excitation of nitrogen in the atmosphere even if the light is weak. Reaching the light detecting unit 201, the ultraviolet light gets into the housing 12 via the entry opening 22 to be collected by the collecting unit 14a, which is provided in the entry opening 22. After passing through the collecting unit 14a, the traveling direction of the ultraviolet light is changed by the travel direction changing unit 13 toward the light detector 11 to enter the light detector 11.

Meanwhile, as for gamma rays that are released from the gamma ray source 2 in the to-be-measured object 3 and have reached the light detecting unit 201, some of the gamma rays reach the shielding member 21, and may be absorbed by the shielding member 21. Only a negligible amount of attenuated gamma rays can reach the light detector 11.

As for the gamma rays that are released from the gamma ray source 2 in the to-be-measured object 3 and have reached the light detecting unit 201, some of the gamma rays reach the entry opening 22 to pass through the collecting unit 14a, the travel direction changing unit 13, and the housing 12 that follows. Only a negligible small amount of gamma rays could be scattered by the collecting unit 14a, the travel direction changing unit 13, or the housing 12 that follows.

As described above, the amount of gamma rays reaching the light detector 11 is very small. Since a required amount of shielding member 21 is provided, contributions of gamma rays will be negligible when ultraviolet light resulting from alpha rays is measured. Therefore, even in the measurement environment where gamma rays and the like exist, signals deriving from alpha rays can be accurately measured.

[Second Embodiment]

Figure 3:
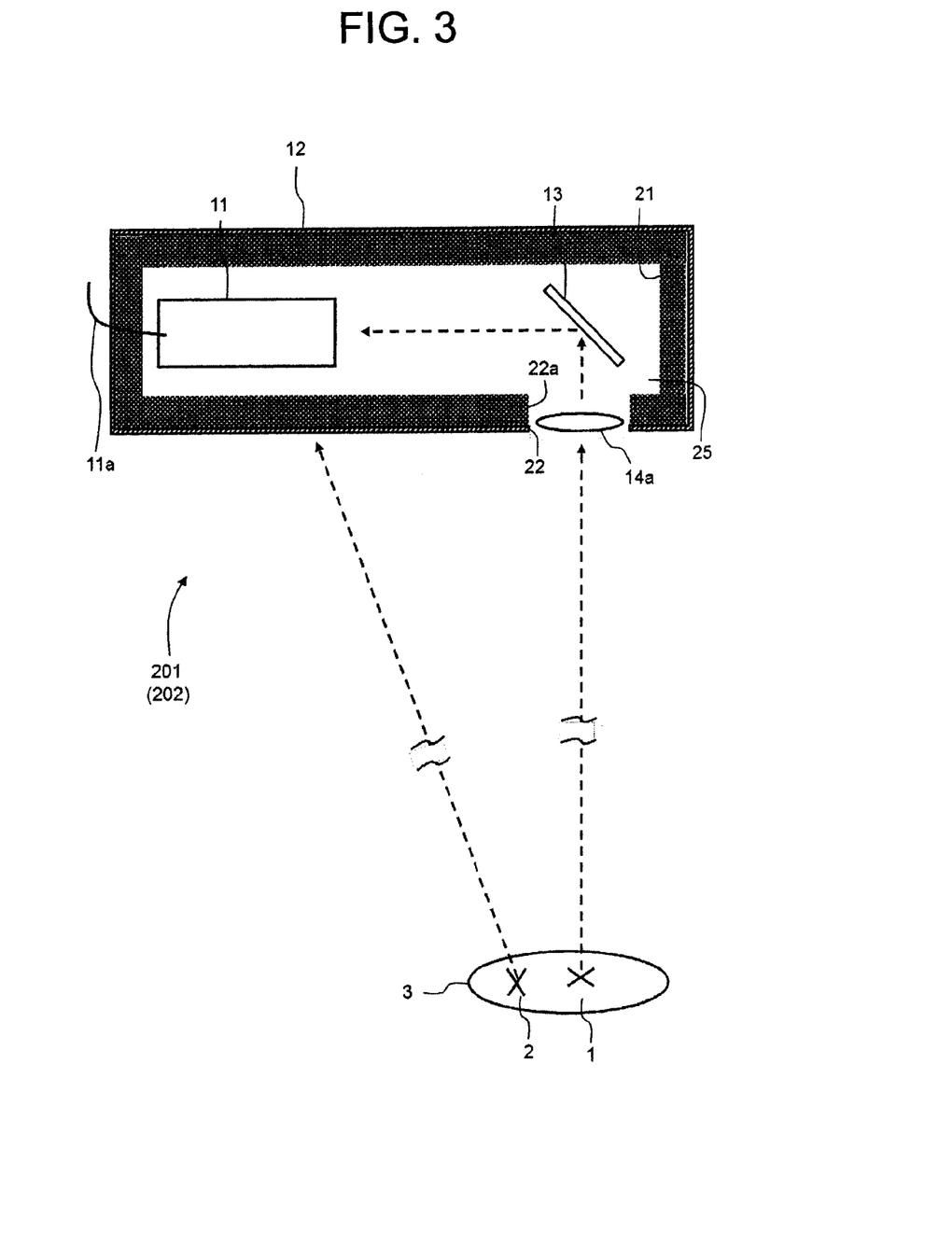
FIG. 3 is a lateral cross-sectional view showing the configuration according to a second embodiment of the present invention.

FIG. 3 is a lateral cross-sectional view showing the configuration according to a second embodiment of the present invention. The present embodiment is a variant of the first embodiment.

A shielding member 21 is formed in such a way as to encircle the light detector 11. Like the inlet 22 of the housing 12, an entry opening 22a is formed in the shielding member 21 to take in ultraviolet light. The shielding member 21 is shaped in such a way as not to block the passage of ultraviolet light, so that the ultraviolet light can reach the light detector 11 via the collecting unit 14a and the travel direction changing unit 13.

In a portion that ultraviolet light initially enters via the entry openings 22 and 22a, or in a portion that is on the opposite side of the inner portion of the collecting unit 14a from the light detector 11, a recessed portion 25 is formed in the shielding member 21.

According to the above-described configuration of the present embodiment, in cases where a gamma ray source 2 also exists outside the to-be-measured object 3, it is possible to prevent gamma rays from directly reaching the light detector 11 from the gamma ray source 2 that exists outside the to-be-measured object 3, because the light detector 11 is encircled by the shielding member 21. Therefore, it is possible to curb the background associated with gamma rays.

Moreover, when gamma rays enter the light detecting unit 201 via the collecting unit 14a from the gamma ray source 2 that exists inside the to-be-measured object 3, the recessed portion 25 of the shielding member 21 prevents the gamma rays from being scattered by this part of the shielding member 21 toward the light detector 11. Therefore, it is possible to reduce the background associated with gamma rays.

[Third Embodiment]

Figure 4:
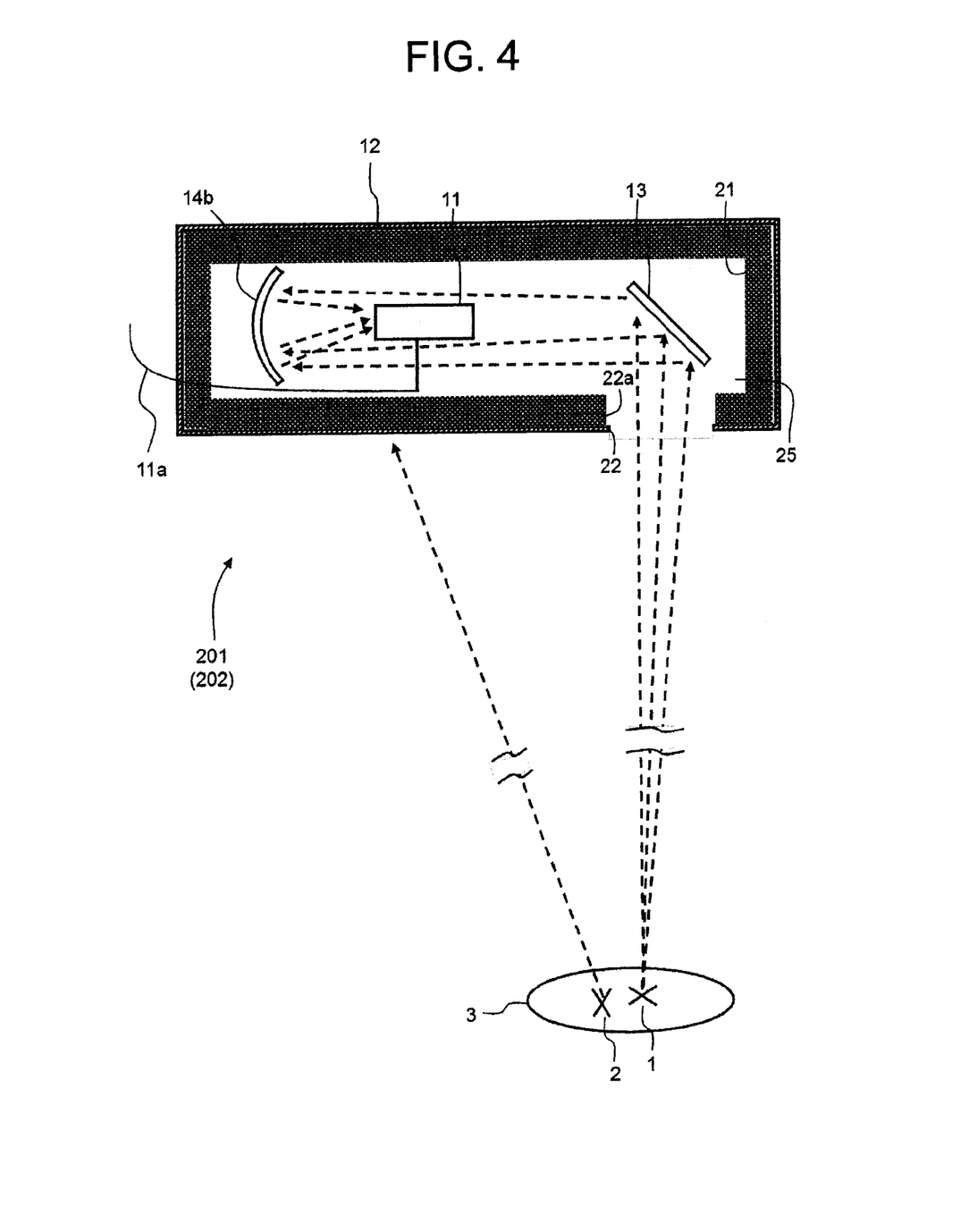
FIG. 4 is a lateral cross-sectional view showing the configuration according to a third embodiment of the present invention.

FIG. 4 is a lateral cross-sectional view showing the configuration according to a third embodiment of the present invention. The present embodiment is a variant of the second embodiment. In the case of the second embodiment, the collecting unit 14a is located at the entry opening 22. However, a collecting unit 14b of the present embodiment is disposed on the opposite side of the light detector 11 from the travel direction changing unit 13. The collecting unit 14b may be a concave mirror, for example, as shown in FIG. 4, or may be a combination of a convex lens and a reflector, for example.

According to the above-described configuration of the present embodiment, ultraviolet light coming from the to-be-measured object 3 enters via the entry opening 22, and the traveling direction of the ultraviolet light is changed by the travel direction changing unit 13 toward the light detector 11. After that, the ultraviolet light reaches the collecting unit 14b, which then collects the ultraviolet light in such a way that the ultraviolet light is focused on a sensing portion of the light detector 11. In this manner, the ultraviolet light reaches the light detector 11.

Since the present embodiment is configured as described above, the same advantageous effects as in the second embodiment can be achieved. Since the collecting unit 14b is disposed at a different position from the collecting unit 14a of the second embodiment, this embodiment offers various ways to design the arrangement of each portion inside the light detecting unit 201. Therefore, this embodiment contributes to making the settings of the configuration of the light detecting unit 201 easier.

[Fourth Embodiment]

Figure 5:
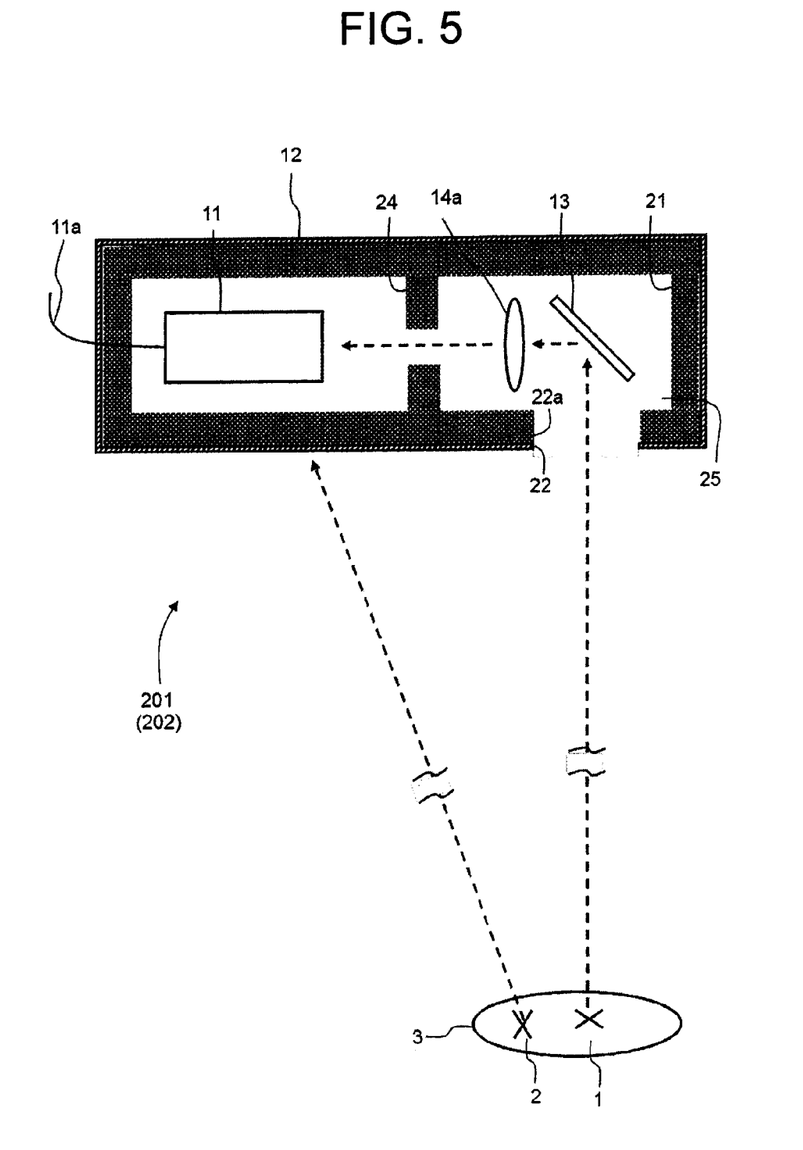
FIG. 5 is a lateral cross-sectional view showing the configuration according to a fourth embodiment of the present invention.

FIG. 5 is a lateral cross-sectional view showing the configuration according to a fourth embodiment of the present invention. The present embodiment is a variant of the second embodiment. According to the present embodiment, on a path of ultraviolet light extending from the travel direction changing unit 13 in the light detecting unit 201 to the light detector 11, a diaphragm portion 24 is provided.

The diaphragm portion 24 is a member that is made of a material that has a radiation shielding function as in the case of the shielding member 21. The diaphragm portion 24 is joined to the shielding member 21. At the center of the diaphragm portion 24, the path of ultraviolet light is formed. The diaphragm portion 24 reduces the amount of gamma rays that pass through the diaphragm portion 24 out of gamma rays that have reached the diaphragm portion 24.

An increase in the thickness of the diaphragm portion 24 in the direction from the travel direction changing unit 13 and the collecting unit 14a to the light detector 11 enhances the effect of attenuation of gamma rays reaching the diaphragm portion 24.

The gamma rays that reach the diaphragm portion 24 have been scattered by the shielding member 21. Therefore, most of the gamma rays are unlikely to have been directed to the light detector 11. Accordingly, the amount of gamma rays that travel straight to the light detector 11 without hitting the diaphragm portion 24 is small; most of the gamma rays that have reached the entrance of the diaphragm portion 24 will attenuate because of absorption and the like by a sidewall of the passage of the diaphragm portion 24. The larger the ratio of the passage-direction length to the area of the passage of the diaphragm portion 24 becomes, the more the gamma rays attenuate.

As the diaphragm portion 24 is provided, gamma rays that enter via the entry opening 22, hit the surrounding shielding member 21, and are reflected toward the light detector 11 can be attenuated by the diaphragm portion 24. As described above, it is possible to further reduce the effects of gamma rays on the light detector 11.

[Fifth Embodiment]

Figure 6:
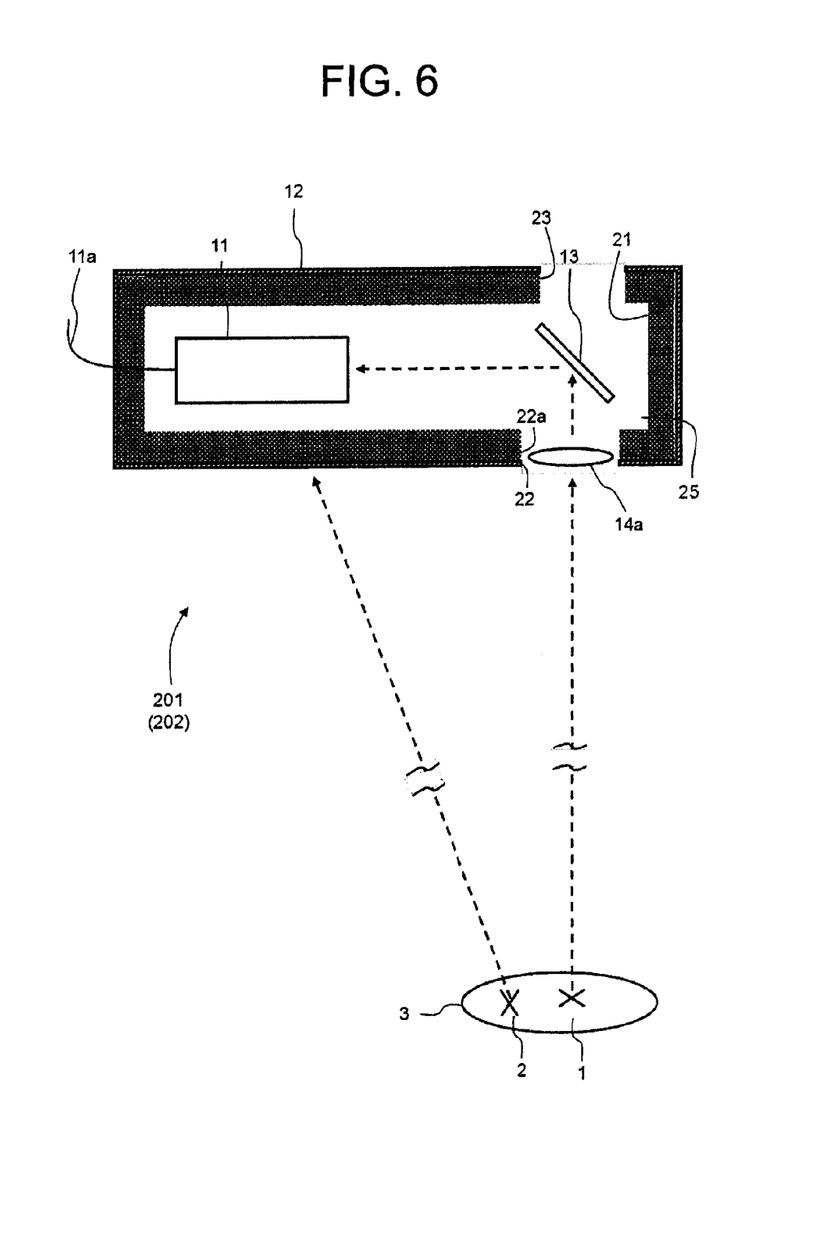
FIG. 6 is a lateral cross-sectional view showing the configuration according to a fifth embodiment of the present invention.

FIG. 6 is a lateral cross-sectional view showing the configuration according to a fifth embodiment of the present invention. The present embodiment is a variant of the second embodiment. In the shielding member 21 of the present embodiment, an opening 23 is formed on the opposite side from the entry opening 22.

According to the above-described configuration of the present embodiment, most of gamma rays that enter the light detecting unit 201 via the collecting unit 14a provided in the entry opening 22 pass through the travel direction changing unit 13 and then through the opening 23 to go out of the light detecting unit 201.

If there is no opening 23, gamma rays are scattered by a portion of the shielding member 21 where the opening 23 is supposed to exist, and there are some gamma-ray components that head to the light detector 11. Therefore, in the present embodiment, it is possible to reduce the background of gamma rays by an amount equivalent to that of the components.

[Sixth Embodiment]

Figure 7:
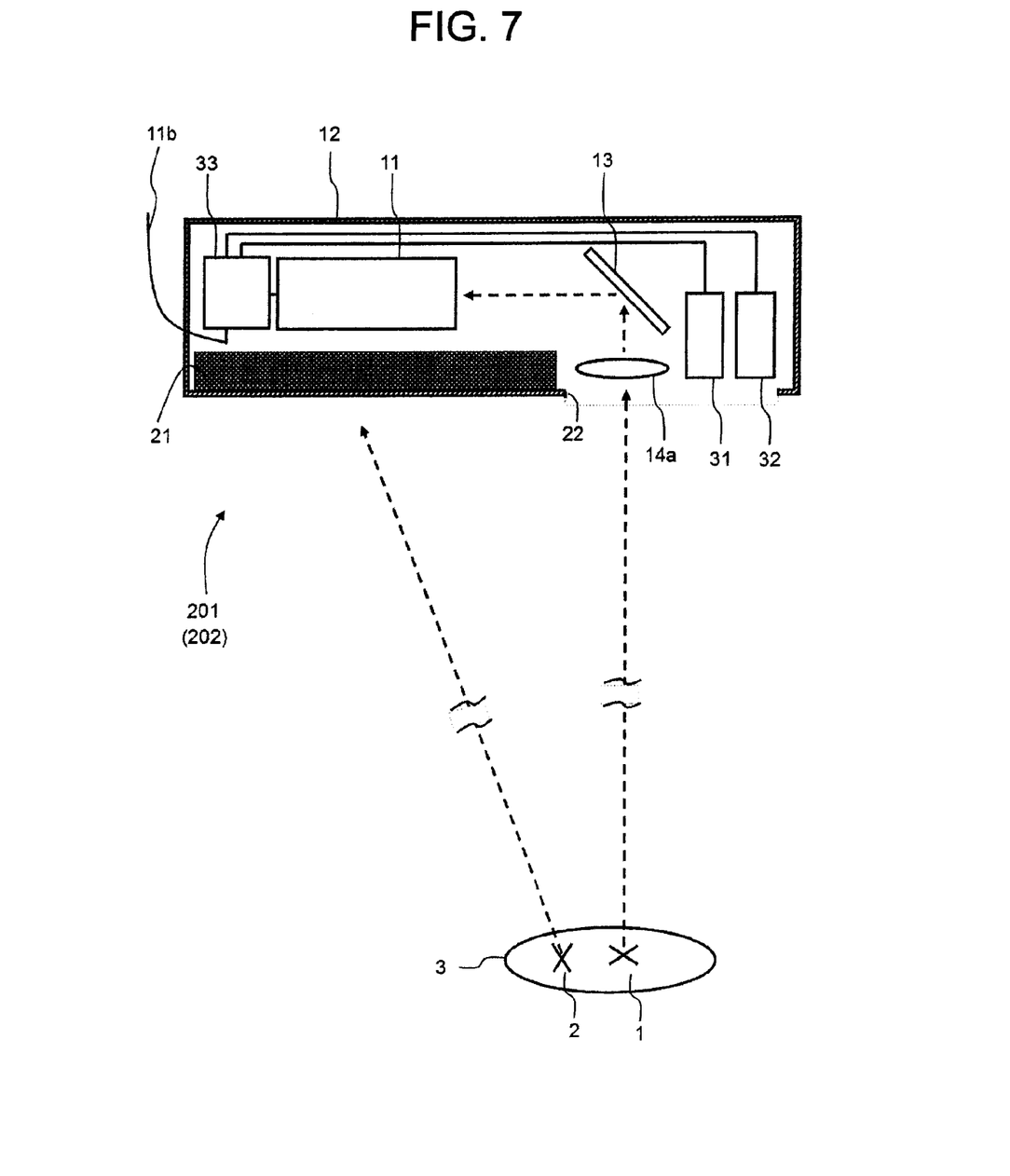
FIG. 7 is a lateral cross-sectional view showing the configuration according to a sixth embodiment of the present invention.

FIG. 7 is a lateral cross-sectional view showing the configuration according to a sixth embodiment of the present invention. The present embodiment is a variant of the first embodiment. According to the present embodiment, the light detecting unit 201 includes a thermometer 31, a hygrometer 32, and a signal correction unit 33.

The thermometer 31 measures a temperature of the atmosphere including the to-be-measured object 3. The hygrometer 32 measures the humidity of the atmosphere including the to-be-measured object 3.

The signal correction unit 33 calculates partial pressure $P_{H2O}$ of water in the atmosphere based on a temperature signal, which is an output of the thermometer 31, and a humidity signal, which is an output of the hygrometer 32. Then, the signal correction unit 33 uses the Stern-Volmer equation, shown below as formula (1), to correct an output signal amount I of the light detector 11:

$$I_0 = (1 + k \cdot P_{H2O}) \cdot I \tag{1}$$

wherein I is an output signal amount of the light detector 11; $I_0$ is a signal amount that is supposed to be obtained when there is no water; k is a constant; and $P_{H2O}$ is partial pressure of water.

The emission of light caused by alpha rays is a phenomenon that occurs when the excited nitrogen returns to the ground state. However, if oxygen or water exists in the air, the excited nitrogen is deprived of energy and therefore de-excited. The oxygen concentration in the air normally remains almost unchanged at about 20%. However, the amount of water in the air varies greatly depending on the season, time, weather, and the like. Therefore, the amount of water in the air could be a factor for measurement error.

According to the configuration of the present embodiment, based on the signals output from the thermometer 31 and hygrometer 32, the partial pressure $P_{H2O}$ of water in the atmosphere is calculated by the signal correction unit 33. Based on the calculated partial pressure $P_{H2O}$ of water, the signal amount $I_0$, which is supposed to be obtained when there is no water, is calculated by the formula (1).

An output of the signal correction unit 33 is taken out of the light detecting unit 201 via an output cable 11b.

As described above, even in the measurement environment where there is a change in humidity in addition to gamma rays, signals deriving from alpha rays can be accurately measured.

In the case of the present embodiment, the thermometer 31 and the hygrometer 32 are housed in the housing 12 of the light detecting unit 201. However, the configuration is not limited to this. Since the temperature and humidity that should be measured are the temperature and humidity in the to-be-measured object 3, the thermometer 31 and the hygrometer 32 are not necessarily required to be housed in the light detecting unit 201. The thermometer 31 and the hygrometer 32, which measure the temperature and humidity of the to-be-measured object 3, may be placed near the to-be-measured object 3 or in any other location, for example.

If there is a plurality of light detecting units 201, the thermometer 31 and the hygrometer 32 may be shared; the output signals of the thermometer 31 and hygrometer 32 may be sent to the signal correction unit 33 of each light detecting unit 201.

[Seventh Embodiment]

Figure 8:
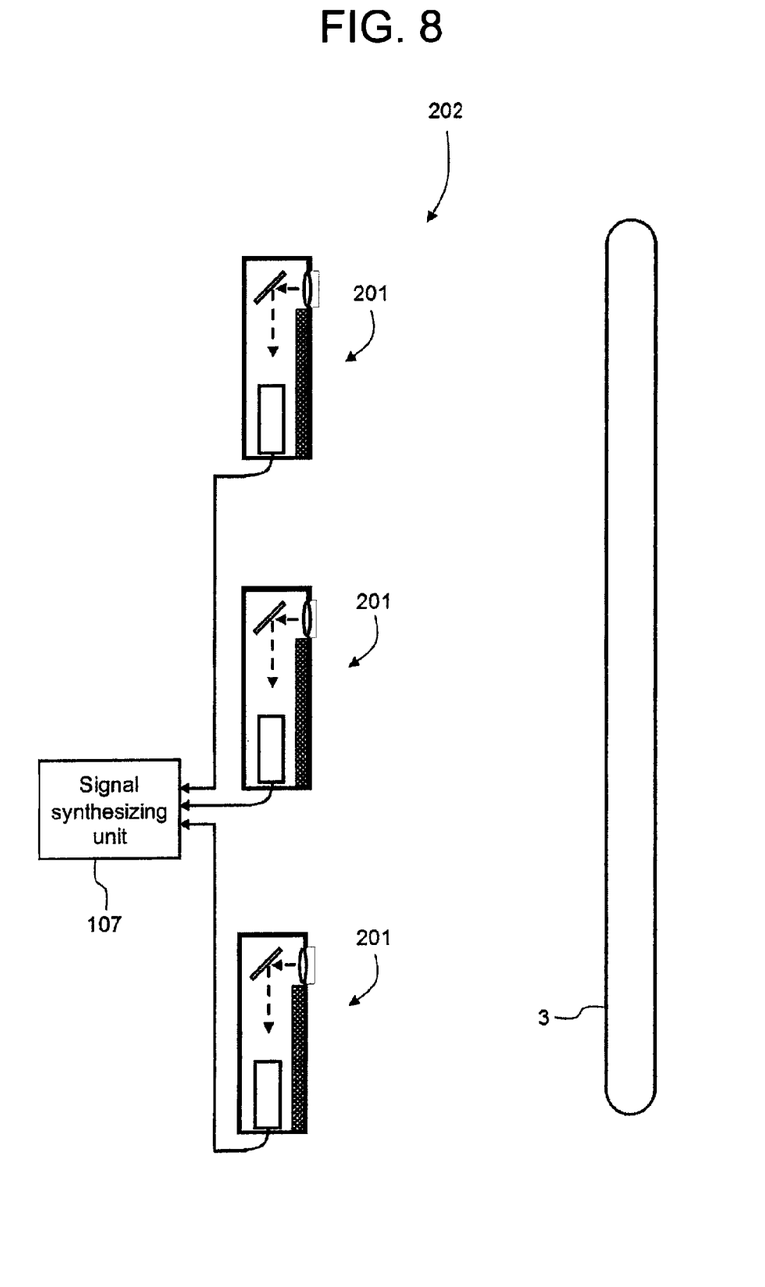
FIG. 8 is a lateral cross-sectional view showing the configuration according to a seventh embodiment of the present invention.

FIG. 8 is a lateral cross-sectional view showing the configuration according to a seventh embodiment of the present invention. An alpha ray observation device 202 of the present embodiment includes three light detecting units 201 and a signal synthesizing unit 107. In this case, the light detecting units 201 may be light detecting units 201 of one of the first to sixth embodiments.

The number of light detecting units 201 is not limited to three. Depending on a spread angle at which a to-be-measured object 3 can be measured from the light detecting units 201, how far the to-be-measured object 3 extends, and the like, the number of light detecting units 201 may be set.

The light detecting units 201 are disposed along a direction in which the to-be-measured object 3 extends in a one-dimensional manner. The signal synthesizing unit 107 receives signals from the three light detecting units 201 and synthesizes the signals in order to calculate a distribution of alpha ray sources 1 in the to-be-measured object 3. The signal synthesizing unit 107 then output the result.

According to the above-described configuration of the present embodiment, the distribution of alpha ray sources in the to-be-measured object can be recognized.

According to the present embodiment, what has been described is the case where the to-be-measured object 3 extends in a one-dimensional manner. However, the present invention can also be applied to cases where the to-be-measured object 3 extends in a two-dimensional manner. In such a case, the light detecting units 201 may be disposed in a two-dimensional manner in order to deal with the spread of the to-be-measured object 3.

[Other Embodiments]

The present invention is described above by way of several embodiments. However, the embodiments are presented only as examples without any intention of limiting the scope of the present invention.

For example, according to the embodiments, what has been described is the case of ultraviolet light caused by interaction between alpha rays and nitrogen in the air atmosphere. However, the present invention can also be applied to light caused by interaction between alpha rays and elements other than nitrogen.

Moreover, features of the embodiments may be used in combination. For example, the collecting unit 14a of the fourth embodiment may be placed at the same position as in the first embodiment.

Furthermore, the above-described embodiment may be put to use in various different ways and, if appropriate, any of the components thereof may be omitted, replaced or altered in various different ways without departing from the spirit and scope of the invention.

Therefore, all the above-described embodiments and the modifications made to them are within the spirit and scope of the present invention, which is specifically defined by the appended claims, as well as their equivalents.

EXPLANATION OF REFERENCE SYMBOLS

1: alpha ray source, 2: gamma ray source, 3: to-be-measured object, 11: light detector, 11a,11b: output cable, 12: housing, 13: travel direction changing unit, 14a, 14: collecting unit, 21: shielding member, 22,22a: entry opening, 23: opening, 24: diaphragm portion, 25: recessed portion, 31: thermometer, 32: hygrometer, 33: signal correction unit, 101: collecting lens, 102: wavelength selection element, 103: , 104: direction changing unit, 105a,105b: light detectors, 106: , 107: signal synthesizing unit, 201: light detecting unit, 202: alpha ray observation device

The invention claimed is:

1. A light detecting unit to observe alpha rays by measuring a generated light generated by alpha rays occurring in a region of a to-be-measured object, comprising:
   a travel direction changing unit configured to change a travelling direction of the generated light;
   a light detector configured to detect direction-changed light of the generated light changed in traveling direction; and
   a shielding member including a portion provided on a straight line extending from the to-be-measured object to the light detector to shield the light detector against radiation.

2. The light detecting unit according to claim 1, wherein the shielding member encircles the light detector and has an entry opening formed to allow the generated light to reach the travel direction changing unit.

3. The light detecting unit according to claim 2, wherein the shielding member has an opening formed on an opposite side from the entry opening.

4. The light detecting unit according to claim 2, wherein the shielding member has a recessed portion formed on an opposite side of the light detector from the travel direction changing unit.

5. The light detecting unit according to claim 2, wherein the shielding member includes a diaphragm portion in which an area of a path of the direction-changed light is small, between the travel direction changing unit and the light detector.

6. The light detecting unit according to claim 1, further comprising
   a generated light collecting unit that is provided on a side of the to-be-measured object of the travel direction changing unit.

7. The light detecting unit according to claim 1, further comprising
   a direction-changed light collecting unit that is provided between the travel direction changing unit and the light detector.

8. An alpha ray observation device, comprising:
   a plurality of the light detecting units according to claim 1; and
   a signal synthesizing unit that calculates a distribution of alpha ray sources, wherein
   the light detecting units are disposed at different positions along a direction in which the to-be-measured object spreads.

9. An alpha ray observation device, comprising:
   a thermometer that measures a temperature of a region of the to-be-measured object;
   a hygrometer that measures a humidity of a region of the to-be-measured object; and
   a light detecting unit according to claim 1, wherein
   the light detecting unit includes a signal correction unit that corrects a result of measurement by the light detector based on a temperature signal supplied from the thermometer and a humidity signal supplied from the hygrometer.

* * * * *